United States Patent
Akiyama et al.

(10) Patent No.: US 12,208,679 B2
(45) Date of Patent: Jan. 28, 2025

(54) CONTROL APPARATUS FOR MOTIVE POWER TRANSMISSION DEVICE, VEHICLE, AND METHOD OF CONTROLLING MOTIVE POWER TRANSMISSION DEVICE

(71) Applicant: TOYOTA JIDOSHA KABUSHIKI KAISHA, Aichi-ken (JP)

(72) Inventors: Yosuke Akiyama, Susono (JP); Akira Ijichi, Odawara (JP); Taichi Kobayashi, Susono (JP); Koji Takaira, Okazaki (JP); Akinori Homan, Toyota (JP); Yoshio Itou, Susono (JP); Kunihiko Usui, Fuji (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 521 days.

(21) Appl. No.: 17/668,289

(22) Filed: Feb. 9, 2022

(65) Prior Publication Data
US 2022/0266688 A1 Aug. 25, 2022

(30) Foreign Application Priority Data
Feb. 12, 2021 (JP) .................. 2021-021040

(51) Int. Cl.
*B60K 23/08* (2006.01)
*B60K 6/365* (2007.10)
(Continued)

(52) U.S. Cl.
CPC .......... *B60K 23/0808* (2013.01); *B60K 6/365* (2013.01); *B60K 6/387* (2013.01);
(Continued)

(58) Field of Classification Search
CPC .................. B60K 23/0808–2023/0891; B60K 17/348–17/36; B60K 6/365; B60K 6/387;
(Continued)

(56) References Cited

U.S. PATENT DOCUMENTS

| | | | | |
|---|---|---|---|---|
| 6,464,608 B2 * | 10/2002 | Bowen | ................. | B60K 17/346 903/910 |
| 2006/0037803 A1 * | 2/2006 | Mori | .................... | B60K 17/344 180/233 |

(Continued)

FOREIGN PATENT DOCUMENTS

WO 2010141682 A1 12/2010

*Primary Examiner* — Ernesto A Suarez
*Assistant Examiner* — Lillian T Nguyen
(74) *Attorney, Agent, or Firm* — HAUPTMAN HAM, LLP

(57) ABSTRACT

A control apparatus for a motive power transmission device equipped with a first input shaft, a second input shaft to which a motive power from a motor is input, a rear wheel-side output shaft from which a motive power is output to a first driving wheel, a front wheel-side output shaft from which a motive power is output to a second driving wheel, and a planetary gear device that has, as three rotating elements, a sun gear to which the second input shaft is coupled, a carrier to which the front wheel-side output shaft is coupled, and a ring gear to which the first input shaft and the rear wheel-side output shaft are coupled engages an engagement device when a torque of the rear wheel-side output shaft is equal to or smaller than a threshold with the motor outputting the motive power.

14 Claims, 9 Drawing Sheets

(51) Int. Cl.
  *B60K 6/387* (2007.10)
  *B60K 6/40* (2007.10)
  *B60K 6/442* (2007.10)
  *B60K 6/52* (2007.10)
  *B60K 17/346* (2006.01)

(52) U.S. Cl.
  CPC ............... *B60K 6/40* (2013.01); *B60K 6/442* (2013.01); *B60K 6/52* (2013.01); *B60K 17/3462* (2013.01); *B60K 2023/0858* (2013.01); *B60Y 2200/92* (2013.01)

(58) Field of Classification Search
  CPC . B60K 6/40; B60K 6/442; B60K 6/52; B60K 17/3462; F16H 7/06; F16H 2057/02052
  See application file for complete search history.

(56) References Cited

U.S. PATENT DOCUMENTS

| | | | |
|---|---|---|---|
| 2018/0201129 A1* | 7/2018 | Coerman | B60W 30/045 |
| 2019/0218983 A1* | 7/2019 | Northrup | B60K 23/0808 |
| 2019/0299779 A1* | 10/2019 | Komatsubara | B60K 23/0808 |

* cited by examiner

ENGINE SIDE ← AXIAL DIRECTION →

ENGINE SIDE ←→ AXIAL DIRECTION

CONTROL APPARATUS FOR MOTIVE POWER TRANSMISSION DEVICE, VEHICLE, AND METHOD OF CONTROLLING MOTIVE POWER TRANSMISSION DEVICE

CROSS-REFERENCE TO RELATED APPLICATION

This application claims priority to Japanese Patent Application No. 2021-021040 filed on Feb. 12, 2021, incorporated herein by reference in its entirety.

BACKGROUND

1. Technical Field

The disclosure relates to a control apparatus for a motive power transmission device, a vehicle, and a method of controlling the motive power transmission device.

2. Description of Related Art

As a motive power transmission device mounted in a vehicle, there is known a transfer that distributes and transmits the motive power from an engine (a first motive power source) to front wheels and rear wheels. An output side of the transfer is coupled to a front-wheel propeller shaft and a rear-wheel propeller shaft. Besides, in the transfer, a change-over can be made between a two-wheel-drive state where the motive power is output to only one of the propeller shafts and a four-wheel-drive state where the motive power is output to both the propeller shafts.

It is disclosed in WO 2010/141682 that in a transfer equipped with a secondary motive power source (a second motive power source) in a transfer case, the motive power output from the second motive power source is transmitted to front wheels and rear wheels via a differential device. In the configuration described in WO 2010/141682, the differential device is caused to function as a transmission, by fixing one of three rotating elements included in the differential device to the transfer case. As a result, rotation of the first motive power source can be changed in speed by the differential device and transmitted to an output member.

SUMMARY

In the configuration described in WO 2010/141682, when the four wheels are driven with the differential device acting in a differential manner, a torque of the second motive power source is applied to a first output shaft and a second output shaft. Thus, the directions of the torques of the respective output shafts may become opposite to each other.

The disclosure has been made in view of the foregoing circumstances. It is an object of the disclosure to provide a control apparatus for a motive power transmission device, a vehicle, and a method of controlling the motive power transmission device that can restrain the directions of torques of respective output shafts from becoming opposite to each other in transmitting motive power via a differential device.

A control apparatus for a motive power transmission device according to the disclosure is a control apparatus for a motive power transmission device equipped with a first input shaft to which a motive power from a first motive power source is input, a second input shaft to which a motive power from a second motive power source is input, a first output shaft from which a motive power is output to a first driving wheel, a second output shaft from which a motive power is output to a second driving wheel, and a differential device that has, as three rotating elements, a first rotating element to which the second input shaft is coupled, a second rotating element to which the second output shaft is coupled, and a third rotating element to which the first input shaft and the first output shaft are coupled. The control apparatus restricts a differential effect of the differential device more when a torque of the first output shaft is equal to or smaller than a threshold than when the torque of the first output shaft is larger than the threshold, with the second motive power source outputting the motive power.

According to this configuration, in transmitting the motive power of the second motive power source via the differential device, the differential effect of the differential device can be restricted more when the torque of the first output shaft is equal to or smaller than the threshold than when the torque of the first output shaft is larger than the threshold. By thus restricting the differential effect of the differential device in accordance with the torque of the first output shaft, the directions of the torques of the respective output shafts can be restrained from becoming opposite to each other.

Besides, the motive power transmission device may be further equipped with an engagement device that selectively couples two of the three rotating elements to each other. The control apparatus may engage the engagement device when the torque of the first output shaft is equal to or smaller than the threshold with the differential device being capable of acting in a differential manner and with the second motive power source outputting the motive power.

According to this configuration, the differential effect of the differential device can be restricted by controlling the engagement device.

Besides, the control apparatus may calculate the torque of the first output shaft based on a torque that is input from the first input shaft to the first output shaft, a torque that is output by the second motive power source, a gear ratio between the second motive power source and the second input shaft, and a gear ratio of the differential device, and compare the calculated torque of the first output shaft with the threshold.

According to this configuration, the torque of the first output shaft can be calculated to be compared with the threshold.

Besides, the second motive power source may be a rotating electrical machine, and the control apparatus may engage the engagement device when regeneration is carried out by the rotating electrical machine.

According to this configuration, the differential effect of the differential device can be restricted by engaging the engagement device when regeneration is carried out by the rotating electrical machine.

Besides, the control apparatus may engage the engagement device when only the second motive power source is driven without driving the first motive power source.

According to this configuration, the differential effect of the differential device can be restricted by engaging the engagement device when power running is carried out by the second motive power source.

Besides, the engagement device may be a friction engagement device that changes over to an engaged state, a half-engaged state, and a released state.

According to this configuration, the friction engagement device can be controlled to the engaged state, the half-engaged state, and the released state.

Besides, the first driving wheel and the second driving wheel may be wheels of the vehicle. The control apparatus may make a degree of engagement of the friction engagement device lower when a degree of turning of the vehicle is high than when the degree of turning of the vehicle is low, in a case where the torque of the first output shaft is equal to or smaller than the threshold with the differential device being capable of acting in a differential manner and with the second motive power source outputting the motive power.

According to this configuration, the degree of engagement of the friction engagement device can be controlled in accordance with the turning situation of the vehicle. Thus, the differential device is allowed to act in a differential manner during the turning of the vehicle. Therefore, the differential between the first output shaft and the second output shaft is allowed.

Besides, the control apparatus may hold the friction engagement device in the half-engaged state during the turning of the vehicle, when the torque of the first output shaft is equal to or smaller than the threshold with the differential device being capable of acting in a differential manner and with the second motive power source outputting the motive power.

According to this configuration, the differential device can be allowed to act in a differential manner, by holding the friction engagement device in the half-engaged state during the turning of the vehicle.

Besides, the engagement device may selectively couple the second rotating element and the third rotating element to each other.

According to this configuration, the differential effect of the differential device can be restricted through the coupling of the second rotating element and the third rotating element by the engagement device. Besides, since the motive power is transmitted without the intermediary of a gear of the differential device, the differential device can be reduced in size.

Besides, the engagement device may selectively couple the first rotating element and the third rotating element to each other.

According to this configuration, the differential effect of the differential device can be restricted through the coupling of the first rotating element and the third rotating element by the engagement device. Besides, since the difference in rotational speed between engagement elements can be set large, the engagement device can be reduced in size.

A vehicle according to the disclosure is equipped with the control apparatus for the motive power transmission device according to the foregoing disclosure.

According to this configuration, in the vehicle, in transmitting the motive power of the second motive power source via the differential device, the differential effect of the differential device can be restricted more when the torque of the first output shaft is equal to or smaller than the threshold than when the torque of the first output shaft is larger than the threshold. By thus restricting the differential effect of the differential device in accordance with the torque of the first output shaft, the directions of the torques of the respective output shafts can be restrained from becoming opposite to each other.

Besides, a method of controlling a motive power transmission device according to the disclosure is a method of controlling a motive power transmission device equipped with a first input shaft to which a motive power from a first motive power source is input, a second input shaft to which a motive power from a second motive power source is input, a first output shaft from which a motive power is output to a first driving wheel, a second output shaft from which a motive power is output to a second driving wheel, and a differential device that has, as three rotating elements, a first rotating element to which the second input shaft is coupled, a second rotating element to which the second output shaft is coupled, and a third rotating element to which the first input shaft and the first output shaft are coupled. The method includes a step of restricting a differential effect of the differential device more when a torque of the first output shaft is equal to or smaller than a threshold than when the torque of the first output shaft is larger than the threshold, with the second motive power source outputting the motive power.

According to this configuration, in transmitting the motive power of the second motive power source via the differential device, the differential effect of the differential device can be restricted more when the torque of the first output shaft is equal to or smaller than the threshold than when the torque of the first output shaft is larger than the threshold. By thus restricting the differential effect of the differential device in accordance with the torque of the first output shaft, the directions of the torques of the respective output shafts can be restrained from becoming opposite to each other.

Besides, the motive power transmission device may be further equipped with an engagement device that selectively couples two of the three rotating elements to each other. The method may further include a step of engaging the engagement device when the torque of the first output shaft is equal to or smaller than the threshold with the differential device being capable of acting in a differential manner and with the second motive power source outputting the motive power.

According to this configuration, the differential effect of the differential device can be restricted by controlling the engagement device.

Besides, the method may further include a step of calculating the torque of the first output shaft based on a torque that is input from the first input shaft to the first output shaft, a torque that is output by the second motive power source, a gear ratio between the second motive power source and the second input shaft, and a gear ratio of the differential device, and a step of comparing the calculated torque of the first output shaft with the threshold.

According to this configuration, the torque of the first output shaft can be calculated to be compared with the threshold.

Besides, the second motive power source may be a rotating electrical machine, and the method may further include a step of engaging the engagement device when regeneration is carried out by the rotating electrical machine.

According to this configuration, the differential effect of the differential device can be restricted by engaging the engagement device when regeneration is carried out by the rotating electrical machine.

Besides, the method may further include a step of engaging the engagement device when only the second motive power source is driven without driving the first motive power source.

According to this configuration, the differential effect of the differential device can be restricted by engaging the engagement device when power running is carried out by the second motive power source.

Besides, the engagement device may be a friction engagement device that changes over to an engaged state, a half-engaged state, and a released state, and the first driving wheel and the second driving wheel may be wheels of the vehicle. The method may further include a step of making a degree of engagement of the friction engagement device lower when a degree of turning of the vehicle is high than when the degree of turning of the vehicle is low, in a case where the torque of the first output shaft is equal to or smaller than the threshold with the differential device being capable of acting in a differential manner and with the second motive power source outputting the motive power.

According to this configuration, the degree of engagement of the friction engagement device can be controlled in accordance with the turning situation of the vehicle. Thus, the differential device is allowed to act in a differential manner during the turning of the vehicle. Therefore, the differential between the first output shaft and the second output shaft is allowed.

Besides, the method may further include a step of holding the friction engagement device in the half-engaged state during the turning of the vehicle, when the torque of the first output shaft is equal to or smaller than the threshold with the differential device being capable of acting in a differential manner and with the second motive power source outputting the motive power.

According to this configuration, the differential device can be allowed to act in a differential manner by holding the friction engagement device in the half-engaged state during the turning of the vehicle.

In the disclosure, in transmitting the motive power of the second motive power source via the differential device, the differential effect of the differential device can be restricted more when the torque of the first output shaft is equal to or smaller than the threshold than when the torque of the first output shaft is larger than the threshold. By thus restricting the differential effect of the differential device in accordance with the torque of the first output shaft, the directions of the torques of the respective output shafts can be restrained from becoming opposite to each other.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A control apparatus for a motive power transmission device, a vehicle, and a method of controlling the motive power transmission device in one of the embodiments of the disclosure will be concretely described hereinafter. Incidentally, the disclosure is not limited to the following embodiment.

Figure 1:
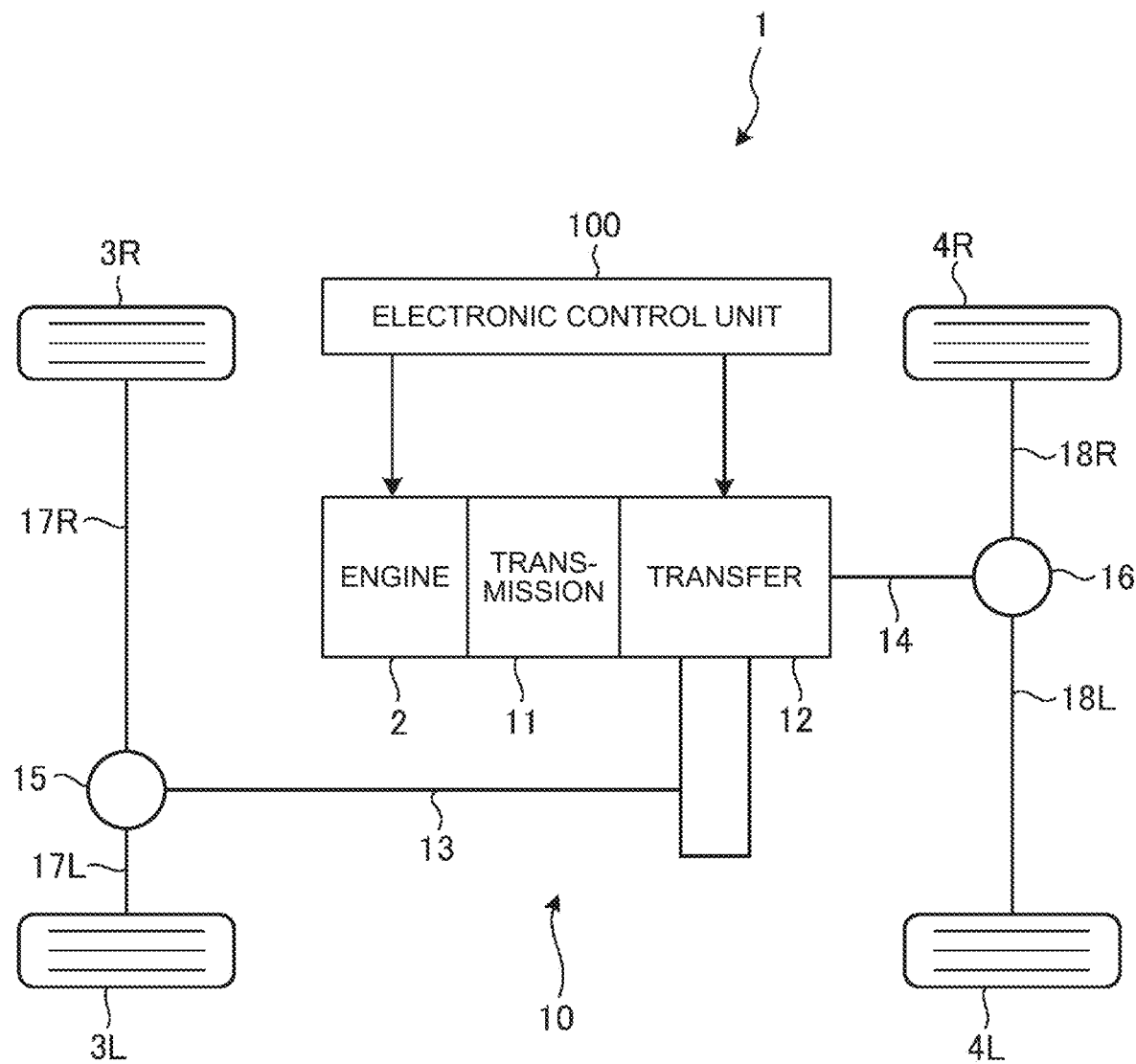
FIG. 1 is a skeleton diagram schematically showing a vehicle of one of the embodiments.

FIG. 1 is a skeleton diagram schematically showing the vehicle of the embodiment. A vehicle 1 is equipped with an engine 2 as a motive power source, a front-right wheel 3R, a front-left wheel 3L, a rear-right wheel 4R, a rear-left wheel 4L, and a motive power transmission device 10 that transmits the motive power of the engine 2 to the front wheels 3 and the rear wheels 4. The vehicle 1 is a four-wheel-drive vehicle based on a front-engine rear-drive configuration. The rear wheels 4 are primary driving wheels that serve as driving wheels both during the running of the vehicle in a two-wheel-drive mode and during the running of the vehicle in a four-wheel-drive mode. On the other hand, the front wheels 3 are secondary driving wheels that serve as driven wheels during the running of the vehicle in the two-wheel-drive mode and that serve as driving wheels during the running of the vehicle in the four-wheel-drive mode. Incidentally, in the present embodiment, the engine 2 is "the first motive power source", each of the rear wheels 4 is "the first driving wheel", and each of the front wheels 3 is "the second driving wheel".

The motive power transmission device 10 is equipped with a transmission 11 coupled to the engine 2, a transfer 12 as a motive power distribution device for the front and rear wheels that is coupled to the transmission 11, a front propeller shaft 13 coupled to the transfer 12, a rear propeller shaft 14 coupled to the transfer 12, a front-wheel differential gear mechanism 15 coupled to the front propeller shaft 13, a rear-wheel differential gear mechanism 16 coupled to the rear propeller shaft 14, front-right and front-left axles 17R and 17L coupled to the front-wheel differential gear mechanism 15, and rear-right and rear-left axles 18R and 18L coupled to the rear-wheel differential gear mechanism 16. Incidentally, in the case where there is no distinction between the right and left sides in particular, the wheels and the axles are referred to as the front wheels 3, the rear wheels 4, the front-wheel axles 17, and the rear-wheel axles 18 respectively with the symbols R and L omitted.

A motive power output from the engine 2 is transmitted to the transfer 12 via the transmission 11. The motive power transmitted to the transfer 12 is then transmitted from the transfer 12 to the rear wheels 4 through a rear wheel-side motive power transmission path, namely, sequentially via the rear propeller shaft 14, the rear-wheel differential gear mechanism 16, and the rear-wheel axles 18. Besides, part of the motive power transmitted to the rear wheel 4 sides is distributed to the front wheel 3 sides by the transfer 12 and transmitted to the front wheels 3 through a front wheel-side motive power transmission path, namely, sequentially via the front propeller shaft 13, the front-wheel differential gear mechanism 15, and the front-wheel axles 17.

Besides, the vehicle 1 is equipped with an electronic control unit 100 that controls the vehicle 1. For example, the electronic control unit 100 is configured to include a microcomputer equipped with a CPU, a RAM, a ROM, an input/output interface, and the like. The CPU performs various kinds of control of the vehicle 1 by performing signal processing in accordance with a program stored in advance in the ROM, while utilizing a temporary storage function of the RAM.

Signals from various sensors mounted in the vehicle 1 are input to the electronic control unit 100. For example, sensor signals from an engine rotational speed sensor, a motor rotational angle sensor, a vehicle speed sensor, an accelerator depression amount sensor, a 4WD selection switch for selecting a four-wheel-drive state through a driver's manipulation, and the like are input to the electronic control unit 100. The electronic control unit 100 performs drive control and the like of the vehicle 1 based on the input sensor signals. Then, a command signal for controlling the engine 2, a command signal for controlling the transmission 11, a command signal for controlling the transfer 12, and the like are output from the electronic control unit 100. That is, the electronic control unit 100 is the control apparatus for the motive power transmission device 10.

Figure 2:
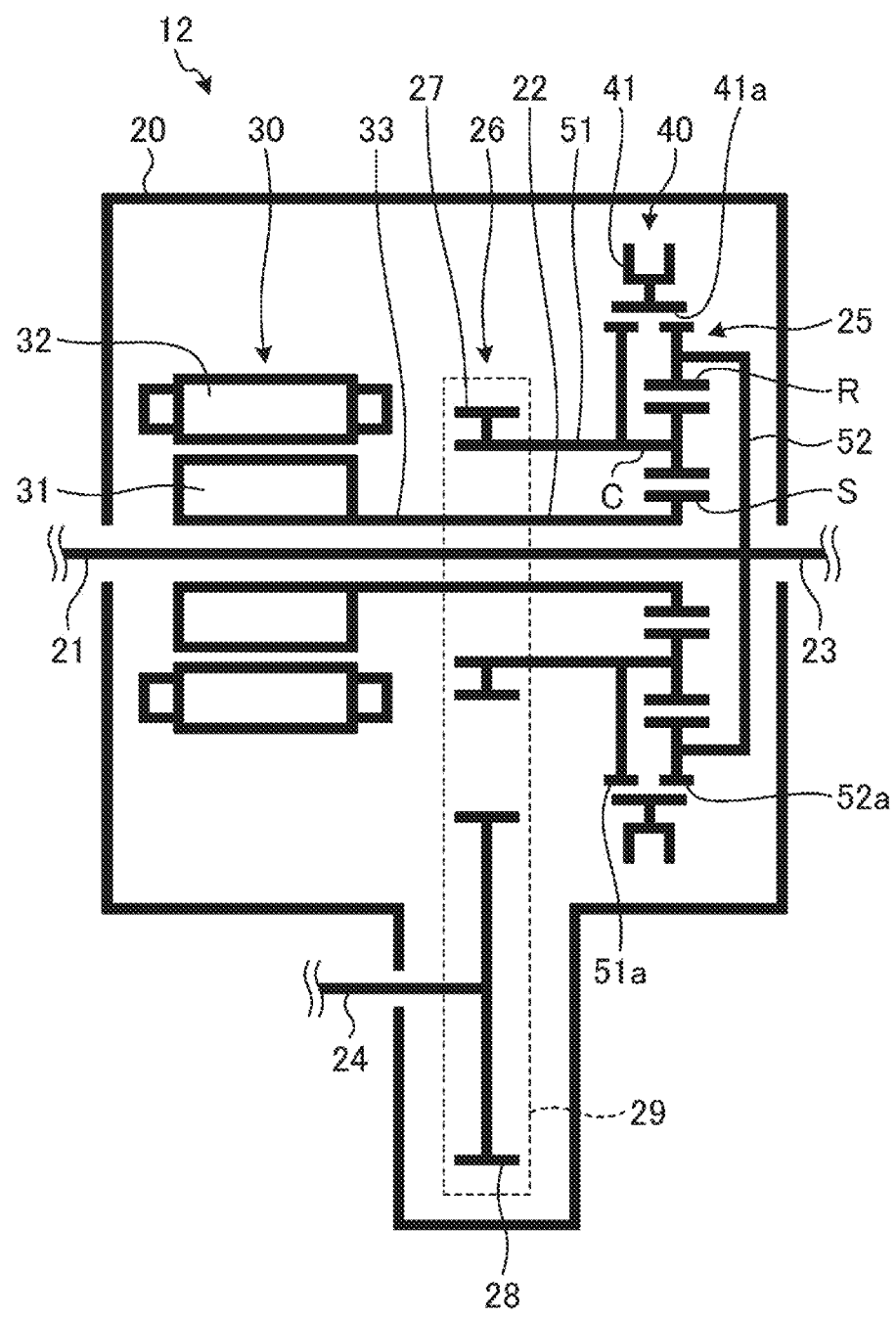
FIG. 2 is a skeleton diagram schematically showing the configuration of a transfer in the embodiment.

FIG. 2 is a skeleton diagram schematically showing the configuration of the transfer in the embodiment. The transfer 12 is equipped with a transfer case 20 that is a non-rotary member. Besides, the transfer 12 is equipped with a first input shaft 21, a second input shaft 22, a rear wheel-side output shaft 23, a front wheel-side output shaft 24, a planetary gear device 25, a transmission device 26, a motor 30, and an engagement device 40 in the transfer case 20. Incidentally, in the present embodiment, the rear wheel-side output shaft 23 is "the first output shaft", the front wheel-side output shaft 24 is "the second output shaft", the planetary gear device 25 is "the differential device", the transmission device 26 is "the first transmission device", and the motor 30 is "the second motive power source".

The first input shaft 21 is an input member for inputting the motive power from the engine 2 to the transfer 12. The motive power from the engine 2 is transmitted to the first input shaft 21 via the transmission 11. For example, the first input shaft 21 is spline-fitted to an output member of the transmission 11.

The second input shaft 22 is an input member for inputting the motive power from the motor 30 to the planetary gear device 25. The motive power from the motor 30 is directly transmitted to the second input shaft 22. For example, the second input shaft 22 is spline-fitted to an output member (a rotor shaft 33) of the motor 30, and rotates integrally with the rotor shaft 33.

The rear wheel-side output shaft 23 is an output member for outputting motive power from the transfer 12 to the rear wheels 4. The rear wheel-side output shaft 23 is a primary drive shaft arranged coaxially with the first input shaft 21 and coupled to the rear propeller shaft 14.

The front wheel-side output shaft 24 is an output member for outputting motive power from the transfer 12 to the front wheels 3. The front wheel-side output shaft 24 is a secondary drive shaft arranged on an axis different from that of the first input shaft 21 and the rear wheel-side output shaft 23 and coupled to the front propeller shaft 13. The front wheel-side output shaft 24 is arranged parallel to the rear wheel-side output shaft 23, and is connected to the planetary gear device 25 via the transmission device 26 in such a manner as to enable the transmission of motive power.

The planetary gear device 25 is a differential device having three rotating elements, and functions as a motive power splitting mechanism that splits the motive power of a motive power source into a motive power for the front wheels 3 and a motive power for the rear wheels 4. The planetary gear device 25 exemplified in FIG. 2 is a single pinion-type planetary gear device. The planetary gear device 25 is equipped with a sun gear S, a carrier C that supports a plurality of pairs of pinion gears meshing with each other respectively such that the pinion gears can rotate around their own axes and rotate around the carrier C, and a ring gear R that meshes with the sun gear S via the pinion gears, as the three rotating elements. In the present embodiment, the sun gear S is "the first rotating element", the carrier C is "the second rotating element", and the ring gear R is "the third rotating element".

The second input shaft 22 is coupled to the sun gear S in such a manner as to rotate integrally therewith. That is, the motor 30 is coupled to the sun gear S.

A first rotating member 51 is coupled to the carrier C in such a manner as to rotate integrally therewith. That is, the front wheel-side output shaft 24 is coupled to the carrier C. The first rotating member 51 is a member that rotates integrally with the carrier C, and has a gear tooth 51a as an engagement element. Moreover, the first rotating member 51 forms a motive power transmission path between the planetary gear device 25 and the front wheel-side output shaft 24.

A second rotating member 52 is coupled to the ring gear R in such a manner as to rotate integrally therewith. The second rotating member 52 is a member that rotates integrally with the ring gear R, and has a gear tooth 52a as an engagement element. The first input shaft 21 and the rear wheel-side output shaft 23 are coupled to the second rotating member 52 in such a manner as to rotate integrally therewith. That is, the first input shaft 21 and the rear wheel-side output shaft 23 are coupled to the ring gear R.

The transmission device 26 is a mechanism that forms a motive power transmission path on the front wheel sides, and is provided in a motive power transmission path between the planetary gear device 25 and the front wheel-side output shaft 24. The transmission device 26 is equipped with a drive gear 27, a driven gear 28, and a chain belt 29.

The drive gear 27 is a rotating member that functions as an output portion to the front wheel sides, and is an output gear that transmits motive power to the front wheel-side output shaft 24. The drive gear 27 is arranged coaxially with the first input shaft 21 and the rear wheel-side output shaft 23, and in such a manner as to be able to rotate relatively to the rear wheel-side output shaft 23. Moreover, the first rotating member 51 and the carrier C are coupled to the drive gear 27 in such a manner as to rotate integrally therewith. That is, in the transfer 12, the drive gear 27 and the respective rotating elements of the planetary gear device 25 are arranged on the same rotational center as that of the first input shaft 21 and the rear wheel-side output shaft 23.

The driven gear 28 is a gear provided integrally with the front wheel-side output shaft 24. A chain belt 29 is a chain for driving the front wheels, and serves to couple the drive gear 27 and the driven gear 28 to each other. Moreover, the driven gear 28 rotates as a result of rotation of the drive gear 27, and the driven gear 28 and the front wheel-side output shaft 24 rotate integrally with each other.

The motor 30 is a rotating electrical machine (a motor-generator) that can function as an electric motor and an electric power generator. Besides, the motor 30 is electrically connected to a battery via an inverter. The motor 30 is equipped with a rotor 31, a stator 32, and a rotor shaft 33. The rotor 31 rotates integrally with the rotor shaft 33. The stator 32 has a stator core, and a stator coil wound around the stator core. The second input shaft 22 is coupled to the rotor shaft 33 in such a manner as to rotate integrally therewith.

The engagement device 40 is a clutch that changes over between an engaged state and a released state, and is a device that changes over the state of the planetary gear device 25. In the transfer 12, the state of the planetary gear device 25 changes over between an integrated state and a differential state, through changeover of the engagement device 40 between the engaged state and the released state.

For example, the planetary gear device 25 assumes a state where the differential effect thereof is restricted (the integrated state) as soon as the engagement device 40 assumes the engaged state. The engaged state is a state where two of the three rotating elements included in the planetary gear device 25 are coupled to each other. The integrated state is a state where the differential effect of the planetary gear device 25 is restricted. Besides, the planetary gear device 25 assumes a state where the planetary gear device 25 is allowed to act in a differential manner, as soon as the engagement device 40 assumes the released state. The released state is a state where the two rotating elements to be coupled to each other are released in such a manner as to be able to rotate relatively to each other. The differential state is a state where the three rotating elements included in the planetary gear device 25 act in a differential manner.

The engagement device 40 is a dog clutch that selectively couples the carrier C and the ring gear R to each other. Therefore, the engagement device 40 changes over the state of the planetary gear device 25 between the integrated state where the carrier C and the ring gear R can rotate integrally with each other and the differential state where the carrier C and the ring gear R can rotate relatively to each other. Moreover, the engagement device 40 has a changeover sleeve 41.

The changeover sleeve 41 has a gear tooth 41a as an engagement element. The gear tooth 41a meshes with a gear tooth 51a of the first rotating member 51 that rotates integrally with the carrier C, and a gear tooth 52a of the second rotating member 52 that rotates integrally with the ring gear R. The changeover sleeve 41 is moved in an axial direction by an actuator of the engagement device 40. The changeover sleeve 41 then changes over between the engaged state where the carrier C and the ring gear R are coupled to each other in such a manner as to be able to rotate integrally with each other and the released state where the three rotating elements can act in a differential manner.

The engagement device 40 assumes the engaged state through the meshing of the gear tooth 41a of the changeover sleeve 41 with both the gear tooth 51a and the gear tooth 52a. On the other hand, the engagement device 40 assumes the released state as soon as the gear tooth 41a of the changeover sleeve 41 fails to mesh with one of the gear tooth 51a and the gear tooth 52a.

Then in the vehicle 1, the motive power of the motive power source is transmitted to the front wheels 3 and the rear wheels 4 via the planetary gear device 25 in the four-wheel-drive state where the front wheels 3 and the rear wheels 4 are driven. In this case, the planetary gear device 25 can change over to the integrated state and the differential state. That is, the transfer 12 can make a changeover between the differential state where the differential effect of rotation between the rear propeller shaft 14 and the front propeller shaft 13 is not restricted and a non-differential state where the differential effect of rotation therebetween is restricted, by changing over the state of the planetary gear device 25 when the four-wheel-drive state is established. That is, in the four-wheel-drive state, the transfer 12 can make a changeover between a case where the rear wheel-side output shaft 23 and the drive gear 27 can act in a differential manner and a case where the rear wheel-side output shaft 23 and the drive gear 27 act in a non-differential manner. In this manner, the transfer 12 can change over to a plurality of drive states through the planetary gear device 25 and the engagement device 40.

Therefore, in controlling the drive state of the transfer 12, the electronic control unit 100 controls the state of the planetary gear device 25 by controlling the behavior of the motor 30 and controlling the state of the engagement device 40. The command signal for controlling the transfer 12 includes a command signal for controlling the motor 30 and a command signal for controlling the engagement device 40. The electronic control unit 100 outputs a command signal to an actuator that activates the engagement device 40, and controls the behavior of the engagement device 40. That is, the electronic control unit 100 is a control unit that controls the engagement device 40. Moreover, the planetary gear device 25 can change over a first mode (an integrated mode) and a second mode (a motive power splitting mode) through the performance of changeover control of the engagement device 40 by the electronic control unit 100.

The integrated mode represents a state (the integrated state) where two of the three rotating elements included in the planetary gear device 25 are coupled to each other. The motive power splitting mode represents a state (the differential state) where the three rotating elements included in the planetary gear device 25 can act in differential manner while being coupled to the motor 30, the rear wheel-side output shaft 23, and the front wheel-side output shaft 24 respectively. Besides, in the transfer 12, the motor 30, the engine 2 and the rear wheel-side output shaft 23, and the front wheel-side output shaft 24 are coupled to the three rotating elements respectively, independently of the state of the planetary gear device 25. Therefore, the motive power splitting mode is synonymous with the differential state.

Besides, the transfer 12 can change over to a plurality of drive states based on the states of the engine 2 and the motor 30 as well as the state of the planetary gear device 25. For example, the transfer 12 can set a first drive state (a fixed distribution 4WD mode) and a second drive state (a torque split 4WD mode).

Figure 4:
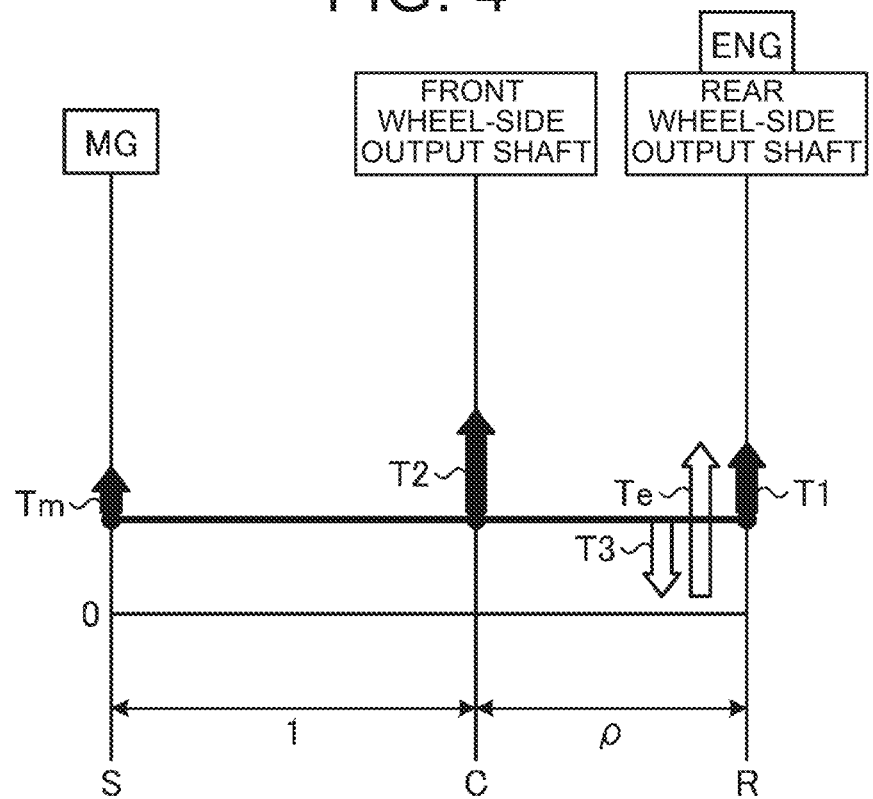
FIG. 4 is a collinear diagram showing a state of rotating elements in a planetary gear device during the torque split 4WD mode.
Figure 5:
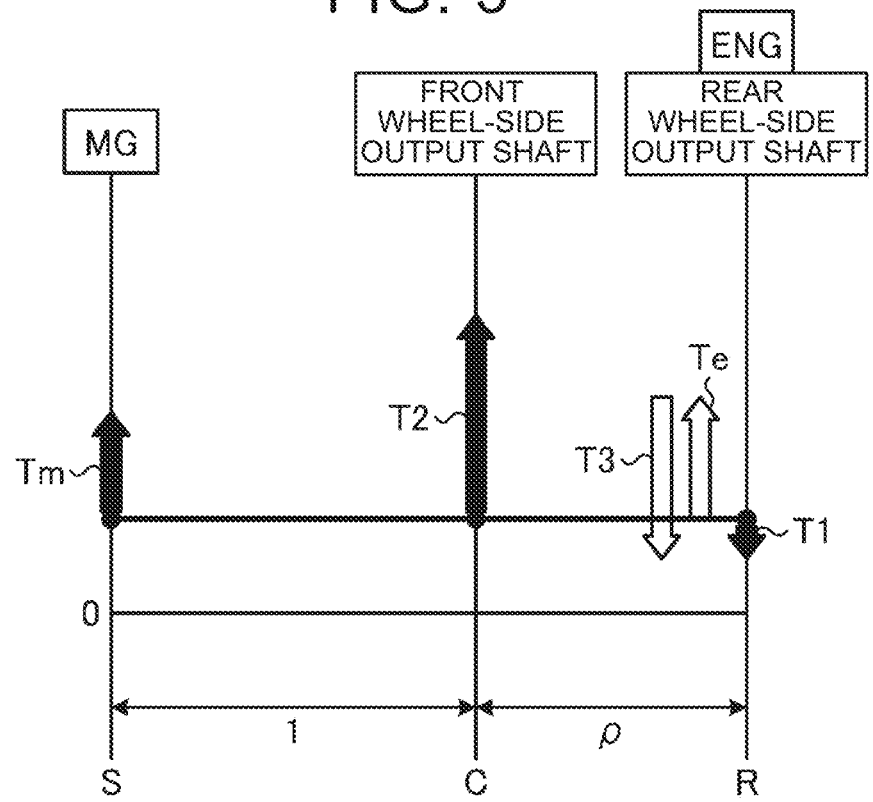
FIG. 5 is a collinear diagram showing another state of the rotating elements in the planetary gear device during the torque split 4WD mode.

The first and second drive states will now be described with reference to FIGS. 2 to 5. Incidentally, each of FIGS. 4 and 5 is a collinear diagram representing the rotational state of the planetary gear device 25. The motor 30 is denoted by "MG", the engine 2 is denoted by "ENG", the sun gear S is denoted by "S", the carrier C is denoted by "C", the ring gear R is denoted by "R", the torque of the first input shaft 21 is denoted by "Te", the torque of the second input shaft 22 is denoted by "Tm", the torque of the rear wheel-side output shaft 23 is denoted by "T1", the torque of the front wheel-side output shaft 24 is denoted by "T2", a reaction torque is denoted by "T3", and the gear ratio of the planetary gear device 25 is denoted by "ρ". Besides, in a relationship among axes of ordinates of each of the collinear diagrams, when there is a distance corresponding to "1" between the sun gear S and the carrier C, there is a distance corresponding to the gear ratio ρ of the planetary gear device 25 (=the number of teeth of the sun gear S/the number of teeth of the ring gear R) between the carrier C and the ring gear R.

First of all, the first drive state (the fixed distribution 4WD mode) will be described with reference to FIG. 2. The first drive state is the four-wheel-drive state where motive power is transmitted to the front wheels 3 and the rear wheels 4, and refers to a case where the engagement device 40 is in the engaged state and the planetary gear device 25 is in the integrated state. The first drive state is the so-called fixed distribution 4WD mode.

The fixed distribution 4WD mode is a mode in which the distribution of motive power transmitted to the rear wheel-side output shaft 23 and the front wheel-side output shaft 24 is mechanically fixed. In the fixed distribution 4WD mode, when the motive power of the engine 2 is distributed to the rear wheel-side output shaft 23 and the front wheel-side output shaft 24, the engagement device 40 is engaged to restrict the differential effect of the planetary gear device 25, so the three rotating elements rotate at the same rotational speed.

Next, the second drive state (the torque split 4WD mode) will be described with reference to FIGS. 3 to 5. The second drive state is the four-wheel-drive state where motive power is transmitted to the front wheels 3 and the rear wheels 4, and refers to a case where the engagement device 40 is in the released state and the planetary gear device 25 is in the differential state. In the second drive state, front-rear distribution control can be performed through a motor torque output from the motor 30. The second drive state is the so-called torque split 4WD mode. The torque split mode is intended to generate a driving force in the front wheels 3 through the motive power of the motor 30, and change the distribution of motive power transmitted to the drive gear 27 and the rear wheel-side output shaft 23.

Figure 3:
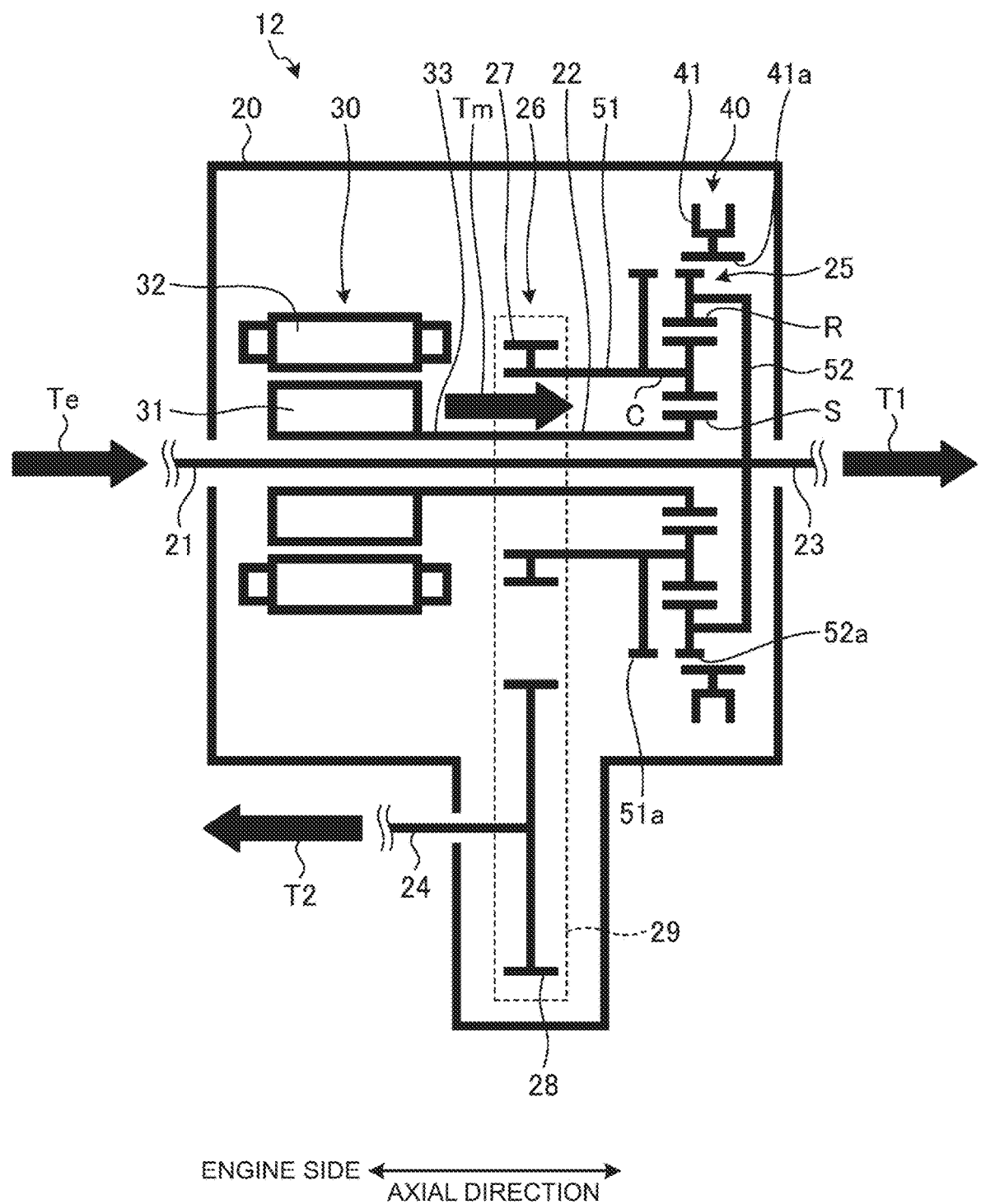
FIG. 3 is a skeleton diagram for illustrating the transfer during a torque split 4WD mode.

As shown in FIG. 3, when the transfer 12 is in the torque split 4WD mode, the engagement device 40 is in the released state, and the changeover sleeve 41 does not mesh with the first rotating member 51. In addition, the planetary gear device 25 in the differential state functions as a motive power splitting mechanism.

As described hitherto, in the torque split 4WD mode, since the planetary gear device 25 is in the motive power splitting mode (the differential state), the torque Te transmitted from the engine 2 to the first input shaft 21 is transmitted to the rear wheel-side output shaft 23, and the torque Tm transmitted from the motor 30 to the second input shaft 22 is transmitted to the front wheel-side output shaft 24 via the planetary gear device 25. In this case, as shown in FIG. 4, the distribution of the motive power transmitted to the front wheel side and the rear wheel side can be controlled by the torque output from the motor 30.

In the example shown in FIG. 4, when the motor 30 applies the torque T2 in a positive direction to the front wheel-side output shaft 24, a torque in a negative direction is applied to the rear wheel-side output shaft 23 as a reaction force thereof. Therefore, the torque Te in the positive direction from the engine 2 and the reaction torque T3 in the negative direction resulting from the reaction force of the torque are applied to the rear wheel-side output shaft 23. Moreover, since the torque Te of the first input shaft 21 applied in the positive direction is larger than the reaction torque T3 applied in the negative direction, the torque T1 of the rear wheel-side output shaft 23 is a torque in the positive direction.

Incidentally, the torque in the positive direction is a torque applied in such a direction as to increase the rotational speed in the positive direction (i.e., in a direction in which the rotational speed in the negative direction is made to approach 0). The torque in the negative direction is a torque applied in such a direction as to reduce the rotational speed in the negative direction (i.e., in a direction in which the rotational speed in the negative direction is made to move away from 0). In the collinear diagram shown in FIG. 4, the torque in the positive direction is denoted by an upward arrow, and the torque in the negative direction is denoted by a downward arrow. Besides, in the collinear diagram, the rotational speed in the positive direction is shown above "0", and the rotational speed in the negative direction is shown below "0".

It should be noted herein that the torque Tm of the second input shaft 22 is obtained through multiplication of a gear ratio between the motor 30 and the second input shaft 22 and a motor torque. The rotor shaft 33 of the motor 30 is coupled in such a manner as to rotate integrally with the second input shaft 22 and the sun gear S, so the gear ratio between the motor 30 and the sun gear S is "1". Therefore, the torque output from the motor 30 is directly applied to the second input shaft 22. Thus, the torque Tm of the second input shaft 22 is equal to the motor torque.

The torque T2 of the front wheel-side output shaft 24 is expressed as T2={(1+ρ)/ρ}×Tm. The reaction torque T3 is expressed as T3=(1/ρ)×Tm. Moreover, the torque T1 of the rear wheel-side output shaft 23 is expressed as T1=Te−T3=Te−(1/ρ)×Tm.

The torque Te of the first input shaft 21 is a torque transmitted from the engine 2 to the first input shaft 21. The first input shaft 21 is directly coupled to the rear wheel-side output shaft 23, and is coupled in such a manner as to rotate integrally with the rear wheel-side output shaft 23 and the ring gear R, so the gear ratio between the first input shaft 21 and the ring gear R is "1". Therefore, the torque Te of the first input shaft 21 is directly applied to the rear wheel-side output shaft 23.

In addition, in the torque split 4WD mode (when the planetary gear device 25 is in the motive power splitting mode), the torque T2 of the front wheel-side output shaft 24 can be increased by increasing the torque output from the motor 30. However, when the motor torque is increased too much to increase the torque T2 of the front wheel-side output shaft 24, the reaction torque T3 increases as well. Therefore, as shown in FIG. 5, the reaction torque T3 may become larger than the torque Te of the first input shaft 21, and the torque T1 of the rear wheel-side output shaft 23 may become a torque in the negative direction.

Thus, the vehicle 1 is configured to restrict the directions of the torque T2 of the front wheel-side output shaft 24 and the torque T1 of the rear wheel-side output shaft 23 from becoming opposite to each other when motive power is transmitted via the planetary gear device 25. The electronic control unit 100 can perform the control of making a changeover from the torque split 4WD mode to the fixed distribution 4WD mode by performing engagement control of the engagement device 40 and changing over the planetary gear device 25 to the integrated state. In the fixed distribution 4WD mode, when the motor torque in the positive direction is applied to the front wheel-side output shaft 24, both the torque T2 of the front wheel-side output shaft 24 and the torque T1 of the rear wheel-side output shaft 23 become torques in the positive direction.

Figure 6:
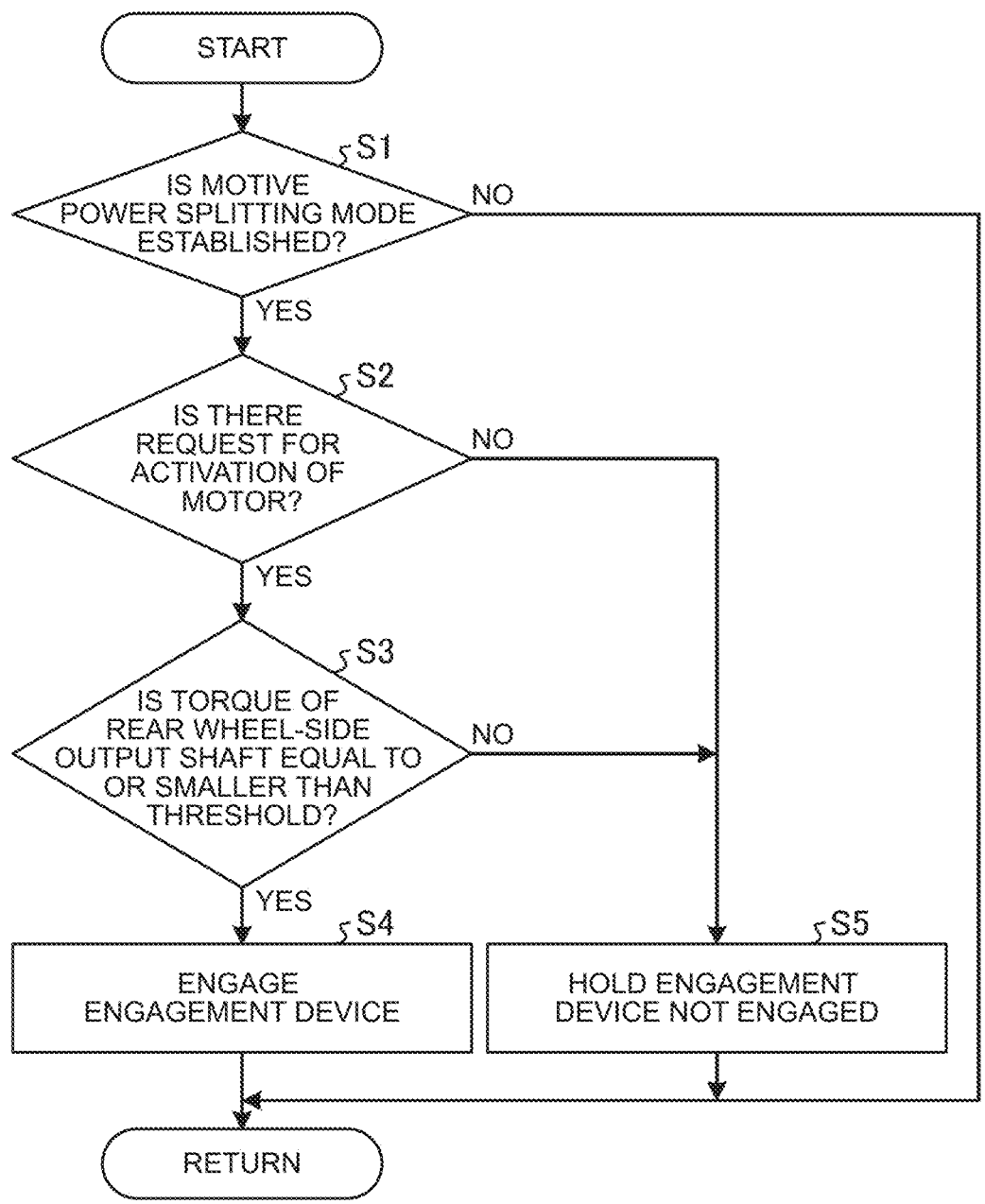
FIG. 6 is a flowchart showing the flow of engagement control.

FIG. 6 is a flowchart showing the flow of engagement control. Incidentally, the control shown in FIG. 6 is repeatedly performed by the electronic control unit 100.

The electronic control unit 100 determines whether or not the planetary gear device 25 is in the motive power splitting mode (step S1). In step S1, it is determined whether or not the planetary gear device 25 is in the motive power splitting mode (the differential state). That is, it is determined whether or not the engagement device 40 is in the released state (is not engaged). Incidentally, the released state is synonymous with the lack of engagement.

If the planetary gear device 25 is not in the motive power splitting mode (No in step S1), this control routine is ended.

If the planetary gear device 25 is in the motive power splitting mode (Yes in step S1), the electronic control unit 100 determines whether or not there is a request for activation of the motor 30 (step S2). In step S2, it is determined whether there is a request for activation of the motor 30, based on a required driving force, a vehicle speed, a gradient, a selected state of the 4WD selection switch, or the like.

For example, the electronic control unit 100 calculates the required driving force based on the vehicle speed and an accelerator depression amount, and determines that there is a request for activation of the motor 30 when the required driving force is larger than a predetermined value, in step S2. The electronic control unit 100 can detect the vehicle speed based on a signal input from the vehicle speed sensor, and can detect the accelerator depression amount based on a signal input from the accelerator depression amount sensor. Besides, the electronic control unit 100 can also determine that there is a request for activation of the motor 30 when the gradient corresponding to a state of a road surface on which the vehicle 1 runs is larger than a predetermined value. Furthermore, the electronic control unit 100 determines whether or not a manipulation of selecting the four-wheel-drive state through the 4WD selection switch has been accepted.

If there is a request for activation of the motor 30 (Yes in step S2), the electronic control unit 100 determines whether or not the torque T1 of the rear wheel-side output shaft 23 is equal to or smaller than a threshold (step S3). In step S3, the electronic control unit 100 calculates the torque T1 of the rear wheel-side output shaft 23, and determines whether or not the calculated torque T1 is equal to or smaller than the threshold. This threshold is a value set in advance. The threshold can be set as a value representing a torque in the positive direction or a value representing a torque in the negative direction. For example, the threshold can be set to a torque in the positive direction or zero to determine that the torque T1 of the rear wheel-side output shaft 23 is about to be reversed. Alternatively, the threshold can also be set to a torque in the negative direction to determine that the torque T1 of the rear wheel-side output shaft 23 has been reversed.

In step S3, the electronic control unit 100 calculates the torque T1 of the rear wheel-side output shaft 23 based on the torque Te input from the first input shaft 21 to the rear wheel-side output shaft 23, the torque output by the motor 30, the gear ratio from the motor 30 to the second input shaft 22, and the gear ratio $\rho$ of the planetary gear device 25. That is, the torque T1 of the rear wheel-side output shaft 23 is calculated using the equation: $T1=Te-(1/\rho)\times Tm$. The calculated torque T1 is compared with the threshold.

Then, if the torque T1 of the rear wheel-side output shaft 23 is equal to or smaller than the threshold (Yes in step S3), the electronic control unit 100 engages the engagement device 40 (step S4). In step S4, a command signal for engaging the engagement device 40 is output from the electronic control unit 100, and the engagement device 40 is changed over from the released state to the engaged state. Upon the performance of step S4, this control routine is ended.

If the torque T1 of the rear wheel-side output shaft 23 is larger than the threshold (No in step S3), the engagement device 40 is held in the released state (step S5). In step S5, the planetary gear device 25 is held in the differential state. Upon the performance of step S5, this control routine is ended.

Besides, if the result of the determination in step S2 is negative (No in step S2) due to the lack of a request for activation of the motor 30, this control routine proceeds to step S5. That is, the planetary gear device 25 is held in the differential state even when there is no request for activation of the motor 30.

As described above, according to the embodiment, the control of engaging the engagement device 40 is performed if the torque T1 of the rear wheel-side output shaft 23 is smaller than the threshold when the motor 30 outputs a torque during the motive power splitting mode. Thus, the torque input from the motor 30 to the planetary gear device 25 can be output to the rear wheel-side output shaft 23 and the front wheel-side output shaft 24 in the same direction, by restricting the differential effect of the planetary gear device 25 by the engagement device 40 when the torque of the motor 30 becomes excessively large and the torque T1 of the rear wheel-side output shaft 23 is about to be reversed (when the directions of the torques of the respective output shafts are about to become opposite to each other).

Besides, as modification examples of the foregoing embodiment, the control apparatus can be configured to be applied to a case where regeneration by the motor 30 is carried out (the first modification example) and a case of an EV mode in which only the motor 30 carries out power running (the second modification example).

First of all, the case where regeneration by the motor 30 is carried out will be described as the first modification example. In the first modification example, in step S3 shown in FIG. 6, it is determined whether or not regeneration by the motor 30 should be carried out. That is, when the torque T1 of the rear wheel-side output shaft 23 is equal to or smaller than the threshold, regeneration by the motor 30 may be carried out. In step S3 of the first modification example, it is determined whether or not regeneration by the motor 30 should be carried out with the output of the engine 2 stopped during the running of the vehicle 1.

Figure 7:
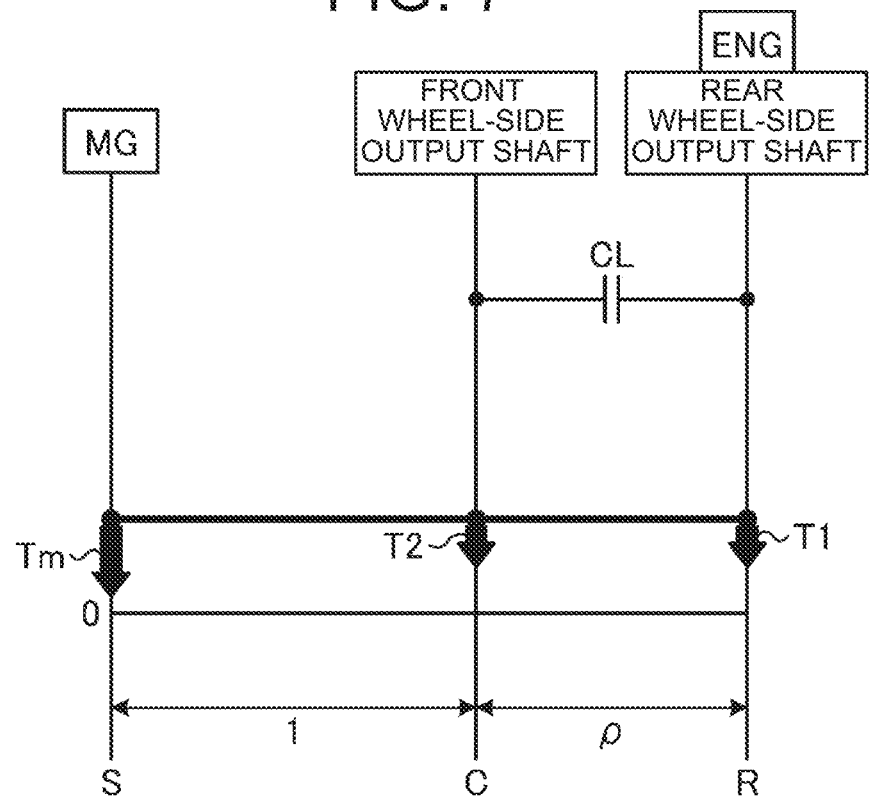
FIG. 7 is a collinear diagram showing a state of rotating elements of a planetary gear device in a first modification example.

For example, while the vehicle 1 runs forward, the rear wheels 4 and the front wheels 3 rotate in the positive direction and the rear wheel-side output shaft 23 and the front wheel-side output shaft 24 rotate in the positive direction. Therefore, even when the planetary gear device 25 is in the differential state, the second input shaft 22 and the motor 30 rotate in the positive direction due to rotation of the driving wheels. Then, upon detecting that an accelerator pedal is stopped from being depressed (the accelerator is OFF) while the vehicle runs forward, the electronic control unit 100 determines that there has been a request for regeneration. When the accelerator pedal is stopped from being depressed, the torque Te transmitted from the engine 2 to the first input shaft 21 becomes zero, so the torque T1 of the rear wheel-side output shaft 23 becomes smaller than the threshold. That is, as the state of the vehicle in the case where the result of the determination in step S2 is positive (Yes in step S2) and the case where the result of the determination in step S3 is positive (Yes in step S3), it is possible to mention a case where regeneration by the motor 30 is carried out. FIG. 7 shows an example of a collinear diagram in carrying out this regeneration. Incidentally, "CL" shown in FIG. 7 denotes the engagement device 40.

As shown in FIG. 7, when regeneration is carried out by an external force from the driving wheels during the running of the vehicle 1, the motor 30 outputs a torque in the negative direction while rotating in the positive direction. Therefore, the torque Tm of the second input shaft 22 is applied in the negative direction. In this case, the engagement device 40 is in the engaged state and the planetary gear device 25 is in the integrated state, so both the torque T1 of the rear wheel-side output shaft 23 and the torque T2 of the front wheel-side output shaft 24 are regenerative torques in the negative direction during regeneration.

As described hitherto, according to the first modification example, regenerative torques in the same direction can be generated by the rear wheel-side output shaft 23 and the front wheel-side output shaft 24, by restricting the differential effect of the planetary gear device 25 through the engagement device 40. Besides, the planetary gear device 25 is in the integrated state during regeneration, and the rear wheel-side output shaft 23 is directly coupled to the motor 30, so regenerative torque limit through direct transmission by the motor 30 can be increased. As a result, the regeneration efficiency is enhanced.

Next, as the second modification example, the case of the EV mode in which only the motor 30 carries out power running will be described. In the second modification example, in step S3 shown in FIG. 6, it is determined whether or not the EV mode in which only the motor 30 carries out power running is established. That is, when the torque T1 of the rear wheel-side output shaft 23 is equal to or smaller than the threshold, only the motor 30 may carry out power running. In step S3 of the second modification example, it is determined whether or not the motor 30 carries out power running with the output of the engine 2 stopped during the running of the vehicle 1.

Figure 8:
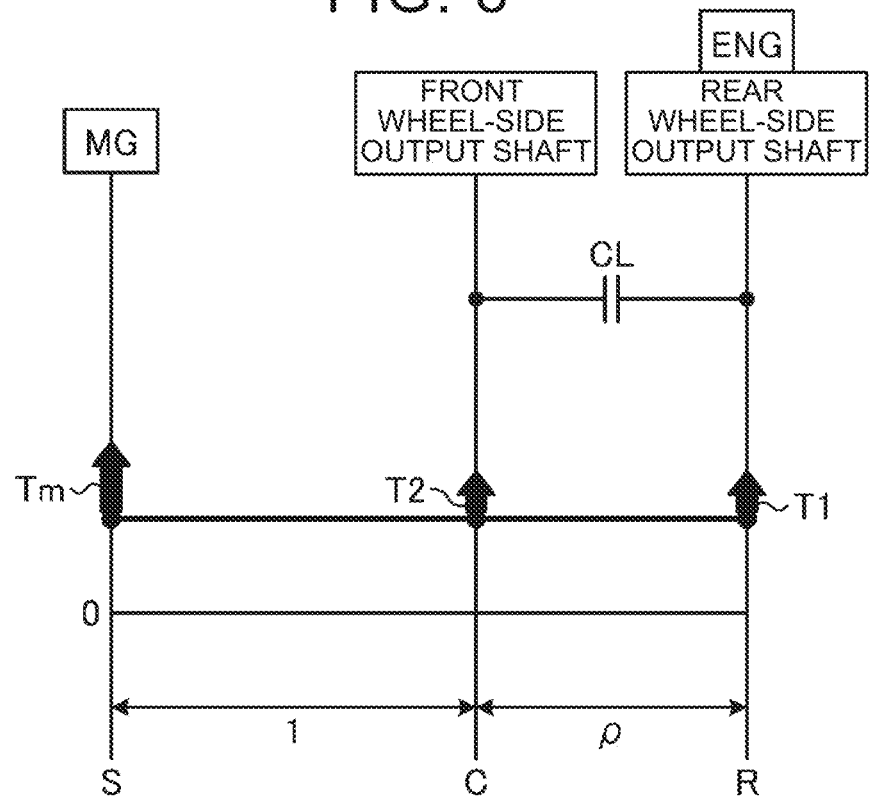
FIG. 8 is a collinear diagram showing a state of rotating elements of a planetary gear device in a second modification example.

When the vehicle 1 runs in the EV mode, the torque Te transmitted from the engine 2 to the first input shaft 21 is zero, so the torque T1 of the rear wheel-side output shaft 23 is small. That is, as the state of the vehicle in the case where the result of the determination in step S2 is positive (Yes in step S2) and in the case where the result of the determination in step S3 is positive (Yes in step S3), it is possible to mention a case where only the motor 30 carries out power running (the EV mode). FIG. 8 shows an example of a collinear diagram at the time when the vehicle 1 thus runs in the EV mode. Incidentally, "CL" shown in FIG. 8 denotes the engagement device 40.

As shown in FIG. 8, when the vehicle 1 runs in the EV mode, the motive power of the motor 30 is transmitted to the respective output shafts via the planetary gear device 25. In this case, the engagement device 40 is engaged to hold the planetary gear device 25 in the integrated state, and hence both the torque T1 of the rear wheel-side output shaft 23 and the torque T2 of the front wheel-side output shaft 24 are power running torques in the positive direction.

As described hitherto, according to the second modification example, power running torques in the same direction can be generated by the rear wheel-side output shaft 23 and the front wheel-side output shaft 24, by restricting the differential effect of the planetary gear device 25 through the engagement device 40 while the vehicle 1 runs in the EV mode. Besides, the planetary gear device 25 is in the integrated state while the vehicle 1 runs in the EV mode, and hence the motor 30 is directly coupled to the rear wheel-side output shaft 23. Therefore, the power running torque limit through direct transmission by the motor 30 can be increased, and the power running efficiency is enhanced. That is, the range in which the vehicle 1 can run in the EV mode can be enlarged.

Besides, as another modification example, the control apparatus can be configured to be applied to a case where the vehicle 1 turns (a third modification example). In the third modification example, it can be determined, based on a turning situation of the vehicle 1, whether or not the engagement device 40 should be engaged. The third modification example will now be described with reference to FIGS. 9 and 10.

Figure 9:
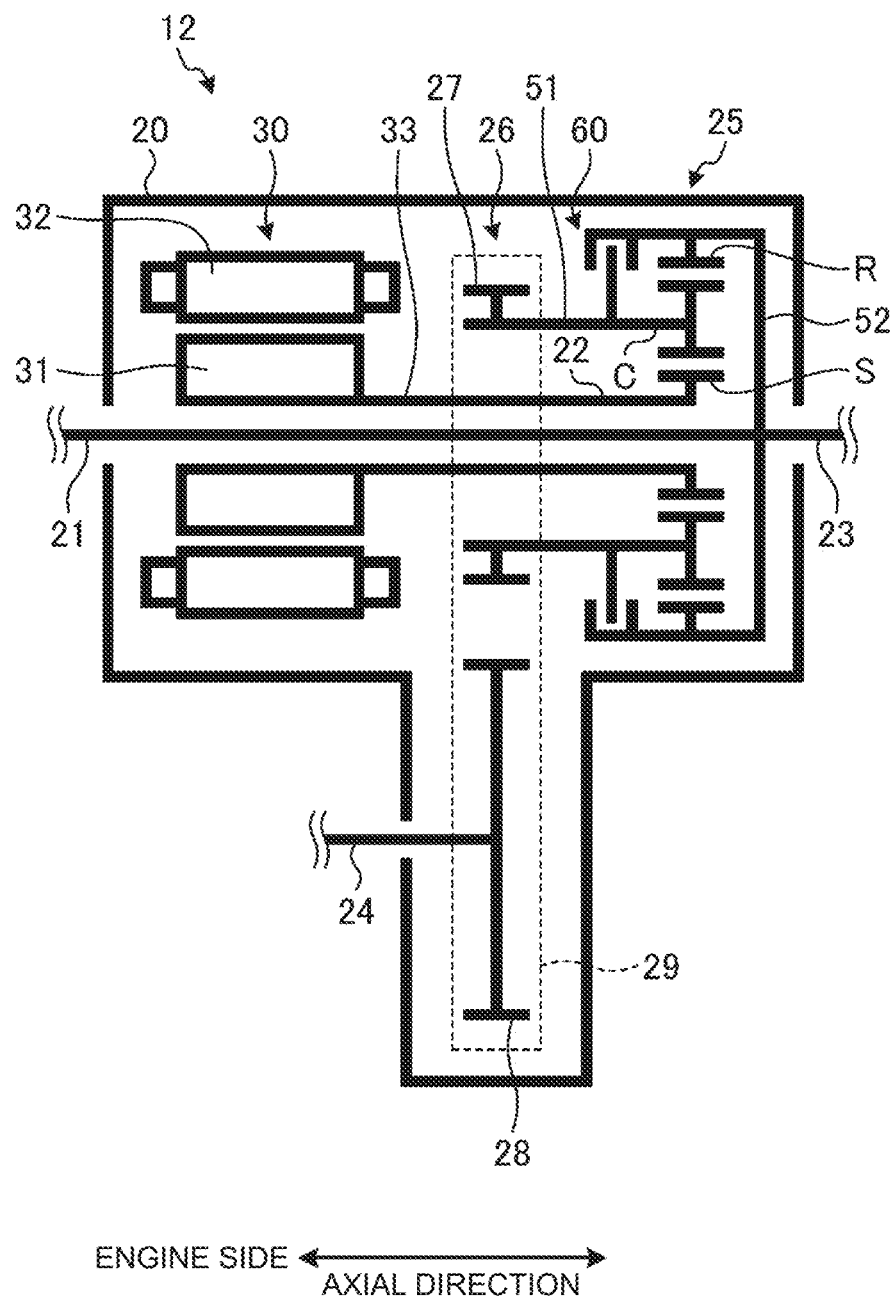
FIG. 9 is a skeleton diagram schematically showing the configuration of a transfer in a third modification example.

FIG. 9 is a skeleton diagram schematically showing the configuration of a transfer in the third modification example. The transfer 12 of the third modification example is equipped with a friction engagement device 60 that selectively couples the carrier C and the ring gear R to each other. That is, the transfer 12 is equipped with the friction engagement device 60 as a friction clutch, instead of the engagement device 40 as a dog clutch.

The friction engagement device 60 has a first friction engagement element that rotates integrally with the first rotating member 51, and a second friction engagement element that rotates integrally with the second rotating member 52. Moreover, the friction engagement device 60 is activated by a hydraulic actuator.

The electronic control unit 100 can perform the control of changing over the friction engagement device 60 to the engaged state, the half-engaged state, and the released state. In addition, the degree of engagement of the friction engagement device 60 is relatively high in the engaged state, and is relatively low in the half-engaged state and the released state. The degree of engagement is higher in the engaged state than in the half-engaged state, and is higher in the half-engaged state than in the released state.

When the friction engagement device 60 is in the engaged state, the friction engagement elements completely engage one another. The engaged state is complete engagement, and the carrier C and the ring gear R rotate integrally with each other.

When the friction engagement device 60 is in the half-engaged state, the friction engagement elements are in contact with one another while being allowed to slip with respect to one another. The half-engaged state is a state where the friction engagement elements are allowed to slip with respect to one another with the friction engagement device 60 having a transmitted torque capacity. That is, the differential between the carrier C and the ring gear R is allowed. Therefore, when the friction engagement device 60 is in the half-engaged state, the rear wheel-side output shaft 23 and the drive gear 27 can act in a differential manner.

When the friction engagement device 60 is in the released state, the friction engagement elements are not in contact with one another. In the released state, there is no transmitted torque capacity, and the friction engagement elements do not slip with respect to one another either.

Besides, the planetary gear device 25 functions as a differential device (a central differential) for the front and rear wheels. Therefore, when the friction engagement device 60 is completely engaged during the turning of the vehicle 1, the difference in rotation between the front and rear wheels cannot be absorbed, and a tight corner braking phenomenon may occur. Thus, the electronic control unit 100 of the third modification example is configured to perform the control of causing the friction engagement device 60 to slip in accordance with the degree of turning of the vehicle 1.

Besides, the electronic control unit 100 can detect, based on a signal input from a steering angle sensor, that the vehicle 1 is turning. Moreover, during the turning of the vehicle 1, the electronic control unit 100 holds the friction engagement device 60 in the half-engaged state without completely engaging the friction engagement device 60, and hence the planetary gear device 25 is allowed to act in a differential manner. Therefore, the control of making a shift to a state where the differential between the rear propeller shaft 14 and the front propeller shaft 13 is allowed is performed. Thus, a difference in rotation between the front wheels 3 and the rear wheels 4 is allowed to be created, so the occurrence of the tight corner braking phenomenon can be suppressed.

Figure 10:
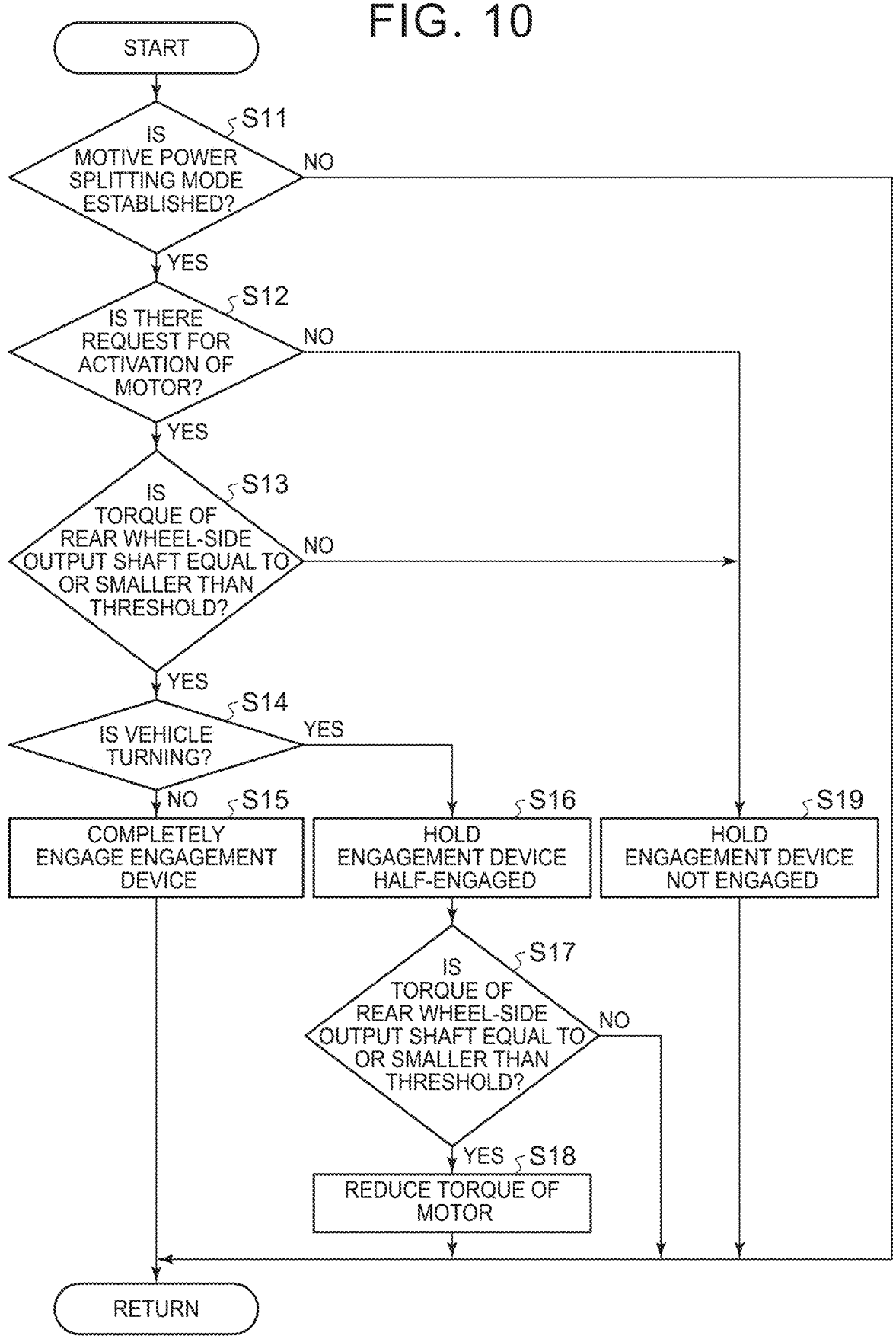
FIG. 10 is a flowchart showing the flow of engagement control of the third modification example.

FIG. 10 is a flowchart showing the flow of engagement control flow of the third modification example. Incidentally, the control shown in FIG. 10 is repeatedly performed by the electronic control unit 100. Besides, the processing of steps S11 to S13 and S19 shown in FIG. 10 are similar to the processing of steps S1 to S3 and S5 shown in FIG. 6, so the description thereof will be omitted.

If the torque T1 of the rear wheel-side output shaft 23 is equal to or smaller than the threshold (Yes in step S13), the electronic control unit 100 determines whether or not the vehicle 1 is turning (step S14). In step S14, it can be determined, based on a signal from the steering angle sensor, that the vehicle 1 is turning when the steering angle is larger than a predetermined value. Besides, it is possible to mention that the degree of turning is high when the vehicle 1 is turning, and that the degree of turning is low when the vehicle 1 is not turning.

If the vehicle 1 is not turning (No in step S14), the electronic control unit 100 completely engages the friction engagement device 60 (step S15). In step S15, the friction engagement device 60 is changed over from the released state to the engaged state through the control by the electronic control unit 100. Upon the performance of the processing of step S15, this control routine is ended.

If the vehicle 1 is turning (Yes in step S14), the electronic control unit 100 holds the friction engagement device 60 in the half-engaged state (step S16). In step S16, the friction engagement device 60 is changed over from the released state to the half-engaged state through the control by the electronic control unit 100. The degree of engagement is lower in the half-engaged state than in the engaged state. That is, the electronic control unit 100 makes the degree of engagement of the friction engagement device 60 lower when the degree of turning of the vehicle 1 is high (Yes in step S14) than when the degree of turning of the vehicle 1 is low (No in step S14).

The electronic control unit 100 then determines whether or not the torque T1 of the rear wheel-side output shaft 23 is equal to or smaller than a threshold with the friction engagement device 60 held in the half-engaged state (step S17). In step S17, with the vehicle 1 turning and with the friction engagement device 60 in the half-engaged state, the torque T1 of the rear wheel-side output shaft 23 is calculated again, and the calculated torque T1 and the threshold are compared with each other. This threshold is the same as the threshold used in step S13.

If the result of the determination in step S17 is positive on the ground that the torque T1 of the rear wheel-side output shaft 23 is equal to or smaller than the threshold (Yes in step S17), the electronic control unit 100 reduces the torque output from the motor 30 (step S18). In step S18, the electronic control unit 100 restricts the output of the motor 30 such that the motor torque becomes small. When the engagement of the friction engagement device 60 is slackened, the torque T1 of the rear wheel-side output shaft 23 may become equal to or smaller than the threshold. Therefore, the torque T1 of the rear wheel-side output shaft 23 is determined again with the friction engagement device 60 in the half-engaged state, and the torque of the motor 30 is reduced if necessary. Upon the performance of the processing of step S18, this control routine is ended.

If it is determined in the processing of determination in step S17 that the torque T1 of the rear wheel-side output shaft 23 is not equal to or smaller than the threshold (No in step S17), this control routine is ended.

Besides, if it is determined in the processing of determination in step S12 that there is no request for activation of the motor 30 (No in step S12), this control routine proceeds to step S19. Furthermore, if it is determined in the processing of determination in step S13 that the torque T1 of the rear wheel-side output shaft 23 is larger than the threshold (No in step S13), this control routine proceeds to step S19.

As described hitherto, according to the third modification example, the control of causing the friction engagement device 60 to slip can be performed in accordance with the degree of turning of the vehicle 1. Thus, the planetary gear device 25 is allowed to act in a differential manner during the turning of the vehicle 1, and the occurrence of the tight corner braking phenomenon can be suppressed.

Figure 11:
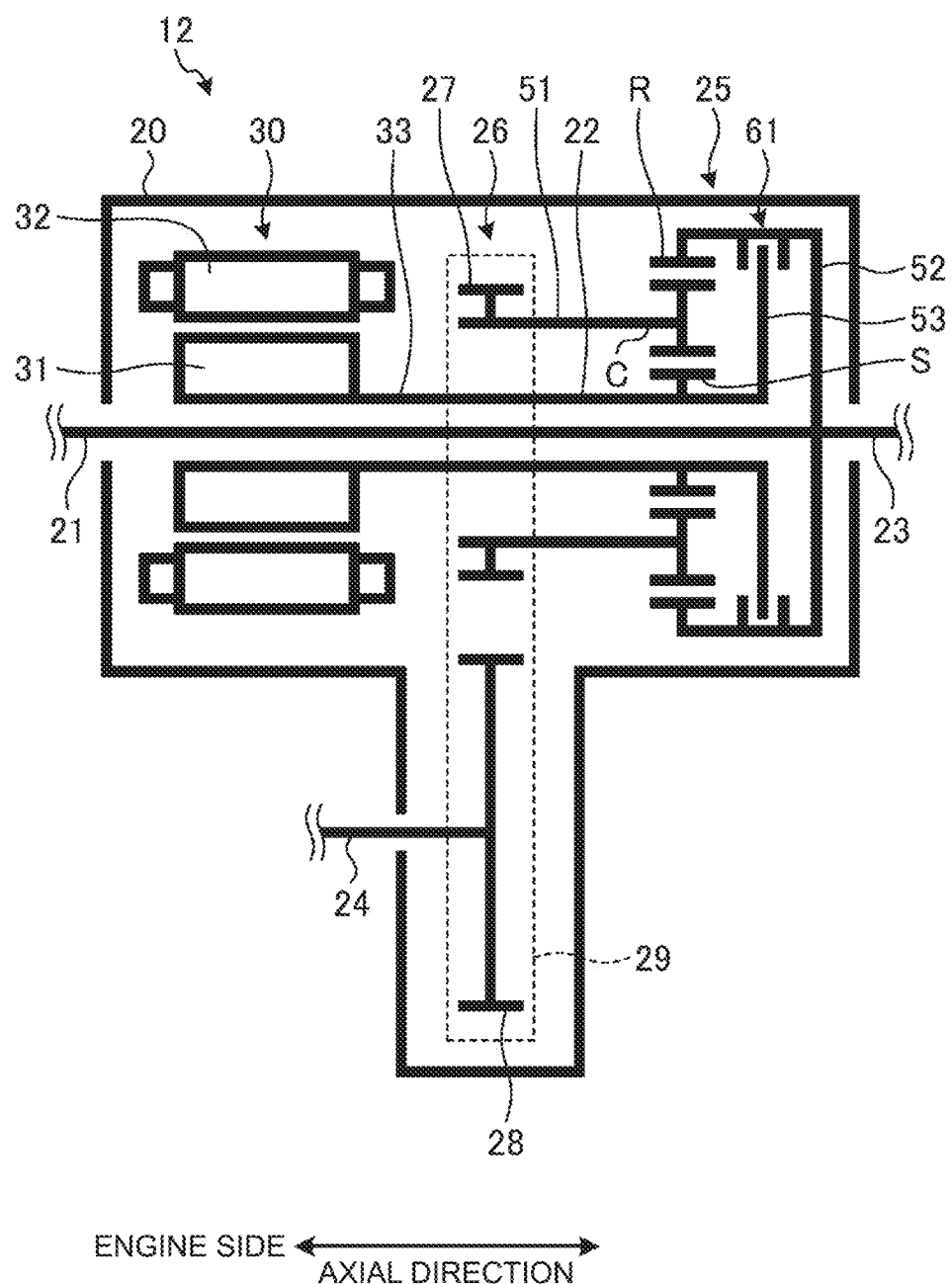
FIG. 11 is a skeleton diagram schematically showing the configuration of a transfer in a fourth modification example.

Besides, as an additional modification example (a fourth modification example) of the third modification example, the carrier C and the ring gear R may not necessarily be coupled to each other in such a manner as to be able to rotate integrally with each other when the three rotating elements are integrated to restrict the differential effect of the planetary gear device 25. That is, the two rotating elements coupled to each other in such a manner as to be able to rotate integrally with each other are not limited in particular, and any two of the three rotating elements may be selectively coupled to each other in the planetary gear device 25. For example, as shown in FIG. 11, the transfer 12 of the fourth modification example is equipped with a friction engagement device 61 that selectively couples the sun gear S (the first rotating element) and the ring gear R (the third rotating element) to each other.

The friction engagement device 61 selectively couples a third rotating member 53 that rotates integrally with the sun gear S, and the second rotating member 52 that rotates integrally with the ring gear R, to each other. The friction engagement device 61 has a first friction engagement element that rotates integrally with the third rotating member 53, and a second friction engagement element that rotates integrally with the second rotating member 52. Moreover, the friction engagement device 61 is activated by a hydraulic actuator.

Besides, the engagement device with which the transfer 12 is equipped may have a function of fixing one of the rotating elements of the planetary gear device 25, a function of changing over the motive power transmission path, and the like in addition to the function of changing over the planetary gear device 25 between the integrated state and the differential state. That is, it is sufficient for the engagement device to have at least the function of changing over the state of the planetary gear device 25 to the integrated state and the differential state.

Besides, the motor 30 may not necessarily be configured to be arranged coaxially with the first input shaft 21 and the rear wheel-side output shaft 23, but may be arranged on an axis different from that of the first input shaft 21 and the rear wheel-side output shaft 23. Furthermore, the motive power output from the motor 30 may be transmitted to the second input shaft 22 via a reduction gear train that consists of a plurality of meshed gears. At this time, rotation of the motor 30 is changed in speed (reduced in speed) and transmitted to the sun gear S. In this case, the electronic control unit 100 can use this reduction ratio (gear ratio) in calculating the torque T1 of the rear wheel-side output shaft 23.

Besides, the motor 30 is configured as the rotating electrical machine (the motor-generator), and hence can generate electric power through the motive power from the engine 2.

The electric power generated by the motor 30 is stored into the battery. Furthermore, the first motive power source may not necessarily be an engine, but may be a rotating electrical machine.

What is claimed is:

1. A control apparatus for a motive power transmission device equipped with a first input shaft to which a motive power from a first motive power source is input, a second input shaft to which a motive power from a second motive power source is input, a first output shaft from which a motive power is output to a first driving wheel, a second output shaft from which a motive power is output to a second driving wheel, and a differential device that has, as three rotating elements, a first rotating element to which the second input shaft is coupled, a second rotating element to which the second output shaft is coupled, and a third rotating element to which the first input shaft and the first output shaft are coupled, the control apparatus restricting a differential effect of the differential device more when a torque of the first output shaft is equal to or smaller than a threshold than when the torque of the first output shaft is larger than the threshold, with the second motive power source outputting the motive power, wherein the motive power transmission device is further equipped with an engagement device that selectively couples two of the three rotating elements to each other, the control apparatus engaging the engagement device when the torque of the first output shaft is equal to or smaller than the threshold with the differential device being capable of acting in a differential manner and with the second motive power source outputting the motive power, the control apparatus calculating the torque of the first output shaft based on a torque that is input from the first input shaft to the first output shaft, a torque that is output by the second motive power source, a gear ratio between the second motive power source and the second input shaft, and a gear ratio of the differential device, and comparing the calculated torque of the first output shaft with the threshold.

2. The control apparatus for the motive power transmission device according to claim 1, wherein the second motive power source is a rotating electrical machine, the control apparatus engaging the engagement device when regeneration is carried out by the rotating electrical machine.

3. The control apparatus for the motive power transmission device according to claim 1, the control apparatus engaging the engagement device when only the second motive power source is driven without driving the first motive power source.

4. The control apparatus for the motive power transmission device according to claim 1, wherein the engagement device is a friction engagement device that changes over to an engaged state, a half-engaged state, and a released state.

5. The control apparatus for the motive power transmission device according to claim 4, wherein the first driving wheel and the second driving wheel are wheels of the vehicle, the control apparatus making a degree of engagement of the friction engagement device lower when a degree of turning of the vehicle is high than when the degree of turning of the vehicle is low, in a case where the torque of the first output shaft is equal to or smaller than the threshold with the differential device being capable of acting in a differential manner and with the second motive power source outputting the motive power.

6. The control apparatus for the motive power transmission device according to claim 5, the control apparatus holding the friction engagement device in the half-engaged state during turning of the vehicle, when the torque of the first output shaft is equal to or smaller than the threshold with the differential device being capable of acting in a differential manner and with the second motive power source outputting the motive power.

7. The control apparatus for the motive power transmission device according to claim 4, wherein the engagement device selectively couples the second rotating element and the third rotating element to each other.

8. The control apparatus for the motive power transmission device according to claim 4, wherein the engagement device selectively couples the first rotating element and the third rotating element to each other.

9. A vehicle that is equipped with the control apparatus for the motive power transmission device according to claim 1.

10. A method of controlling a motive power transmission device equipped with a first input shaft to which a motive power from a first motive power source is input, a second input shaft to which a motive power from a second motive power source is input, a first output shaft from which a motive power is output to a first driving wheel, a second output shaft from which a motive power is output to a second driving wheel, and a differential device that has, as three rotating elements, a first rotating element to which the second input shaft is coupled, a second rotating element to which the second output shaft is coupled, and a third rotating element to which the first input shaft and the first output shaft are coupled, the method comprising:

a step of restricting a differential effect of the differential device more when a torque of the first output shaft is equal to or smaller than a threshold than when the torque of the first output shaft is larger than the threshold, with the second motive power source outputting the motive power, wherein the motive power transmission device is further equipped with an engagement device that selectively couples two of the three rotating elements to each other, the method further comprising:

a step of engaging the engagement device when the torque of the first output shaft is equal to or smaller than the threshold with the differential device being capable of acting in a differential manner and with the second motive power source outputting the motive power;

a step of calculating the torque of the first output shaft based on a torque that is input from the first input shaft to the first output shaft, a torque that is output by the second motive power source, a gear ratio between the second motive power source and the second input shaft, and a gear ratio of the differential device; and a step of comparing the calculated torque of the first output shaft with the threshold.

11. The method of controlling the motive power transmission device according to claim 10, wherein the second motive power source is a rotating electrical machine, the method further comprising:

a step of engaging the engagement device when regeneration is carried out by the rotating electrical machine.

12. The method of controlling the motive power transmission device according to claim 10, the method further comprising:

a step of engaging the engagement device when only the second motive power source is driven without driving the first motive power source.

13. The method of controlling the motive power transmission device according to claim 10, wherein the engagement device is a friction engagement device that changes over to an engaged state, a half-engaged state, and a released state, and the first driving wheel and the second driving wheel are wheels of the vehicle, the method further comprising:

a step of making a degree of engagement of the friction engagement device lower when a degree of turning of the vehicle is high than when the degree of turning of the vehicle is low, in a case where the torque of the first output shaft is equal to or smaller than the threshold with the differential device being capable of acting in a differential manner and with the second motive power source outputting the motive power.

14. The method of controlling the motive power transmission device according to claim 13, the method further comprising:

a step of holding the friction engagement device in the half-engaged state during turning of the vehicle, when the torque of the first output shaft is equal to or smaller than the threshold with the differential device being capable of acting in a differential manner and with the second motive power source outputting the motive power.

* * * * *